Aug. 7, 1951  W. B. WIGHT, JR  2,563,386
FISH LURE
Filed March 19, 1948
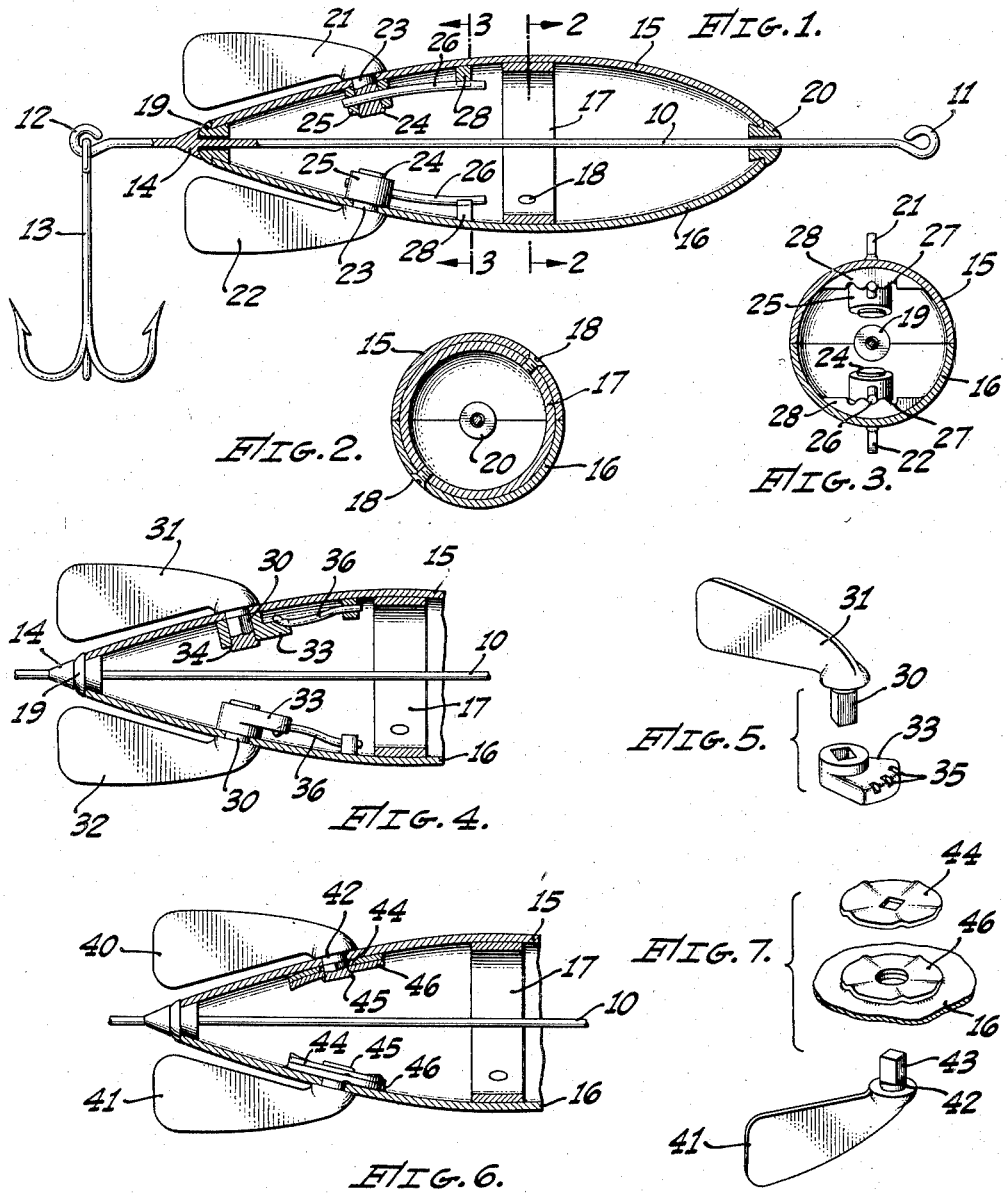
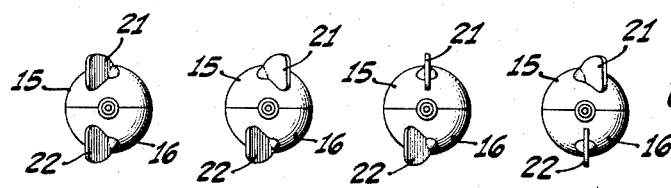
Walter B. Wight, Jr.
INVENTOR.
BY Hazard & Miller
ATTORNEYS.

Patented Aug. 7, 1951

2,563,386

UNITED STATES PATENT OFFICE 2,563,386

FISH LURE

Walter B. Wight, Jr., Los Angeles, Calif.

Application March 19, 1948, Serial No. 15,769

1 Claim. (Cl. 43—42.22)

This invention relates to improvements in fish lures. A primary object of the invention is to provide an improved fish lure adjacent the rear end of which there are one or more rudders which are adjustable relatively to the body of the lure so that on adjusting the rudders with relation to the lure, the lure may optionally be caused to spin or, on being trolled through the water, to dive or dart in a manner so as to attract fish. In the preferred form of construction two diametrically opposed rudders are employed each of which are independently adjustable with relation to the body. By means of the adjustment, the body of the lure may be caused to spin in either direction and in this manner, if the lure on spinning in one direction causes the fishing line to which it is attached to twist, the rudders can be quickly adjusted to cause the lure to spin in the opposite direction and thus untwist the line.

Another object of the invention is to provide a fish lure consisting of a hollow body on which independently adjustable rudders are mounted and to provide a means for holding the rudders in adjusted positions that is disposed entirely within the body. In this manner the body of the lure may have a smooth or streamlined exterior with the exception of the rudders so that danger of weeds or grass becoming caught on the lure during trolling is substantially eliminated.

Another object of the invention is to provide an improved fish lure the body of which is so designed as to be capable of easy construction and assembly.

With the foregoing and other objects in view, which will be made manifest in the following detailed description and specifically pointed out in the appended claim, reference is had to the accompanying drawings for an illustrative embodiment of the invention, wherein:

Figure 1 is a longitudinal vertical section through one form of fish lure embodying the present invention;

Figs. 2 and 3 are transverse sections taken substantially upon the lines 2—2 and 3—3, respectively, on Fig. 1;

Fig. 4 is a partial view in vertical section of an alternative form of fish lure embodying the present invention;

Fig. 5 is an exploded view illustrating details of construction illustrated in Fig. 4;

Fig. 6 is a view similar to Fig. 4 but illustrating still another alternative form of construction embodying the invention;

Fig. 7 is an exploded view of details of construction illustrated in Fig. 6; and Figs. 8, 9, 10 and 11 are rear views in elevation illustrating various adjustments that the rudders of the fish lure may be given.

Referring to the accompanying drawings wherein similar reference characters designate similar parts throughout, the improved fish lure comprises a wire or rod 10 having an eye 11 formed on its forward end to which its leader may be connected and by which the lure may be attached to a fishing rod. The rear end of this wire or rod may be formed with a similar eye as indicated at 12 for the attachment of a fish hook 13 thereto. Forwardly of the eye 12 there is disposed a shoulder 14 which limits rearward movement of the lure with relation to the wire 10.

The body of the lure is preferably symmetrical and of elongated shape. It consists of two opposed sheet metal halves 15 and 16 which are assembled together about a cylindrical ring 17 and secured thereto such as by screws 18. These halves mutually cooperate to form a torpedo-shaped body at the end of which there are disposed bushings or bearings 19 and 20 which fit loosely around the wire 10 so as to enable the body to spin relatively to the wire.

Rudders are mounted for swinging movement on the body adjacent the rear end thereof and in the preferred form of construction there are two of such rudders disposed diametrically opposite each other. Such rudders are illustrated at 21 and 22. Each rudder in the form illustrated in Fig. 1 has a shank 23 extending through the wall of its body part and which is riveted over as indicated at 24 so as to retain thereon a locking washer or sleeve 25. Each shank 23 has secured thereto a spring arm 26 which has its swinging or free end engageable with any of three notches 27 formed on a transverse rib 28 that is integral with or otherwise secured to the interior of each of the body parts.

It will be observed from the above described construction that each rudder 21 and 22 is independently adjustable with relation to the body of the lure and that each rudder may be swung or turned about the axis of its shank 23 as a center. In so doing the spring arm 26 is merely cammed out of one notch 27 in swinging the rudder from one position to another so that each rudder is capable of assuming either of three different positions with relation to the body of the lure. In the central notch 27 the spring arm 26 serves to retain its rudder in a plane coincident with the axis of the body of the lure whereas in either of the side notches 27 the spring arm 26 will cause its rudder to be retained or deflected either toward the right or to the left.

In the construction illustrated in Figs. 4 and 5, the shanks 30 on the rudders 31 and 32 carry notched quadrants 33. The shanks as illustrated in Fig. 5 are preferably squared or non-circular and on being extended through the corresponding holes in the quadrants are riveted over as illustrated at 34. The quadrants have notches 35 formed therein, there being preferably three of such notches, and a spring arm 36 which is secured in any suitable manner to the interior of its body part is engageable with any of the notches to releasably hold its rudder in any adjusted position.

In the construction illustrated in Figs. 6 and 7, the rudders 40 and 41 have shanks 42 which extend through their respective body parts, the innermost ends of the shanks being squared or rendered non-circular as indicated at 43 so as to fit a corresponding hole in a corrugated washer 44. This corrugated washer is adapted to be retained on the shank such as by riveting over as indicated at 45 and urged into engagement with a complementary corrugated washer 46 that may be soldered, brazed, spot-welded or otherwise secured to the interior of its body part.

In the constructions illustrated in Figs. 4 and 6, as well as in the construction illustrated in Fig. 1, each rudder is independently adjustable with relation to the body of the lure and when adjusted into a given position will be releasably retained in such position. The rudder may be caused to assume positions as illustrated in Figs. 1, 3, 4 and 6 wherein the rudders are in planes coincident with the axis of the lure. On the other hand, as illustrated in Fig. 8, both rudders may be adjusted into a position extending laterally in the same direction and as illustrated in this figure the rudders extend laterally toward the left. Conversely, it is possible to adjust both rudders so that both of them extend toward the right. When the rudders are thus adjusted the lure, on being trolled through the water, tends to have a leaping or darting action designed to attract the attention of fish.

As illustrated in Fig. 9, however, one rudder may be adjusted laterally toward the right and the other rudder may be adjusted laterally toward the left so that if the rudders are adjusted as illustrated in Fig. 9, the body of the lure will be caused to spin with relation to the wire 10 in a counter-clockwise manner. Although the body of the lure is intended to freely spin or rotate with relation to the wire 10, as is well known a spinning lure, regardless of the presence of swivels, will frequently bring about a twist in the trolling line. When this occurs it is merely necessary to reversely adjust the rudders from the position shown in Fig. 9 to cause the lure to spin in a clockwise direction and on using the lure for a short time in this manner the fishing line may be untwisted by the lure itself. The rudders may optionally be given other adjusted positions such as shown in Figs. 10 and 11 to cause the lure to rotate or spin at a slower speed and to somewhat combine therewith a darting or diving tendency on the part of the lure.

It will, of course, be appreciated that it is not essential to manufacture the body of the lure of sheet metal and that other materials may be substituted therefor if so desired. I find it convenient, however, to manufacture the body parts, ring 17 and the rudders of copper or other corrosion-resistant material. As illustrated on the drawing the particular manner in which the rudders are held in adjusted positions is subject to considerable variation but in all forms it is highly desirable to have the adjustment-maintaining means disposed entirely within the hollow body of the lure so that there will be no external devices on which grass or weeds are apt to catch in the course of trolling. The rudders themselves project laterally only a slight distance beyond the maximum diameter of the body and as they present relatively smooth surfaces danger of weeds or grass becoming caught thereon is to a large extent avoided.

Various changes may be made in the details of construction without departing from the spirit and scope of the invention as defined by the appended claim.

I claim:

A fishing lure comprising a two-section hollow body having opposite openings in the walls thereof and projections extending inwardly from said walls and longitudinally spaced from said openings, and each projection having a plurality of recesses at the free end thereof, rudders for the body, each rudder having a shoulder engaging an exterior wall surface of the body and provided with a shank extending through one of the openings, a collar on said shank, said collar and shank having aligned openings, and a rod extending through the openings in the collar and shank and adapted to be received adjacent one end thereof in one of the recesses in one of said projections.

WALTER B. WIGHT, Jr.

REFERENCES CITED

The following references are of record in the file of this patent:

UNITED STATES PATENTS

| Number | Name | Date |
|---|---|---|
| 146,764 | James | Jan. 27, 1874 |
| 1,188,583 | Townsend | June 27, 1916 |
| 1,393,617 | Frame | Oct. 11, 1921 |
| 1,610,029 | Wyrill | Dec. 7, 1926 |

FOREIGN PATENTS

| Number | Country | Date |
|---|---|---|
| 1,992 | Great Britain | of 1888 |
| 23,482 | Great Britain | of 1899 |
| 355,593 | Great Britain | Aug. 27, 1931 |
| 615,092 | Great Britain | Dec. 31, 1948 |